United States Patent [19]

Fritsch

[11] Patent Number: 5,356,211
[45] Date of Patent: Oct. 18, 1994

[54] MAGNET VALVE

[75] Inventor: Siegfried Fritsch, Sonthofen, Fed. Rep. of Germany

[73] Assignee: Robert Bosch GmbH, Stuttgart, Fed. Rep. of Germany

[21] Appl. No.: 127,032

[22] Filed: Sep. 24, 1993

[30] Foreign Application Priority Data

Oct. 29, 1992 [DE]  Fed. Rep. of Germany ....... 4236482

[51] Int. Cl.$^5$ ............... B60T 8/36; F15B 13/044; F15B 9/12; H01F 7/16
[52] U.S. Cl. ................. 303/119.2; 303/900; 303/15; 303/901; 137/596.17
[58] Field of Search ............ 303/119.2, 119.1, 92, 303/901, 900, 116.1, 15, 117.1, 113.1, 113.2, DIG. 3, DIG. 4, 84.1, 84.2; 188/181 A, 181 R; 137/596.17; 251/129.11, 129.15, 129.22, 129.02, 129.19

[56] References Cited

U.S. PATENT DOCUMENTS

| | | | |
|---|---|---|---|
| 3,989,063 | 11/1976 | Brouwers et al. | 303/68 |
| 4,579,146 | 4/1986 | Tsura et al. | 303/119.2 |
| 4,765,693 | 8/1988 | Stegmaier | 303/119.2 |
| 4,859,005 | 8/1989 | Rey et al. | 303/119.2 |
| 4,860,794 | 8/1989 | Parrott et al. | 303/119.2 |
| 4,898,434 | 2/1990 | Kohno et al. | 303/119.2 |
| 4,922,966 | 5/1990 | Kaes et al. | 303/119.2 |
| 5,042,886 | 8/1991 | Sato | 303/15 |
| 5,127,435 | 7/1992 | Takata et al. | 303/119.2 |
| 5,167,442 | 12/1992 | Alaze et al. | 303/119.2 |
| 5,203,617 | 4/1993 | Wilde | 303/119.2 |
| 5,218,996 | 6/1993 | Schmitt-Matzon | 303/119.2 |
| 5,234,030 | 8/1993 | Kervagoret et al. | 303/119.2 |
| 5,253,930 | 10/1993 | Maruta et al. | 303/15 |
| 5,261,731 | 11/1993 | Yogo et al. | 303/119.2 |

*Primary Examiner*—Douglas C. Butler
*Attorney, Agent, or Firm*—Edwin E. Greigg; Ronald E. Greigg

[57] ABSTRACT

A magnet valve for anti-lock vehicle brake systems, having a valve inlet for a connection of a pressure source, and a valve outlet for connection of a pressure receiver. A valve member that controls the connection between the valve inlet and outlet. An electromagnet, which is triggerable by a minimum and maximum exciter current for actuating the valve member counter to a force of a restoring spring. A throttle, which is operative between the valve inlet and outlet for delaying a pressure rise at the valve outlet. The throttle is disposed for selective switching in the valve member, and the valve member is embodied such that by triggering of the electromagnet with the minimum exciter current ($I_1$), the throttle between the valve inlet and the valve outlet is switched on, and upon triggering of the electromagnet by the maximum exciter current ($I_2$) and in the absence of electromagnet triggering, the valve inlet and outlet are each disconnected from one another or made to communicate with one another, respectively.

17 Claims, 3 Drawing Sheets

MAGNET VALVE

BACKGROUND OF THE INVENTION

The invention is directed to improvements in magnet valves, particularly for anti-lock vehicle brake systems.

A known magnet valve of this kind, as an inlet valve, is part of a magnet valve assembly in an anti-lock brake system; the assembly comprises a total of three magnet valves actuated by one common electromagnet (U.S. Pat. No. 4,765,693). In this inlet magnet valve, the throttle is formed by a perforated disk that is located downstream of the valve inlet. At the same time, this perforated disk serves to support a restoring spring that urges the valve member in the valve closing direction. The valve member is coupled to the electromagnet in such a way that when there is no current through the electromagnet, the valve member is lifted from the associated valve seat counter to the restoring spring, and when there is current to the electromagnet the valve member is released by the restoring spring for the closing motion.

Parallel to the aforementioned magnet valve, a second magnet valve, also used as an inlet valve is disposed between the valve inlet and the valve outlet of the magnet valve assembly; this second magnet valve likewise has a perforated disk, but its diameter is substantially larger than the throttle diameter of the first perforated disk mentioned. The restoring spring is again supported on the perforated disk and on the valve member and urges the valve member in the closing direction of the second magnet valve. The magnet valve is coupled to the electromagnet via a spring acting counter to the restoring spring; the spring forces are adapted, taking into account the pressure forces acting on the valve member from the valve inlet and from the valve outlet, in such a way that once magnet excitation has been shut off, the valve member does not open until a pressure difference operative in the closing direction drops below a predetermined value.

As a result of the two parallel inlet magnet valves, actuated by the same electromagnet, it is achieved that when the anti-lock system is active, when there is a major pressure difference between the valve inlet and the valve outlet only the magnet valve containing the throttle is opened, so that the rise in brake pressure at the valve outlet and hence in the wheel brake cylinder is slowed down, while when the anti-lock system is not active, in other words upon brake pedal actuation, when there are only slight pressure differences between the valve inlet and the valve outlet, both magnet valves are opened, so that large flow cross sections are available and brake pressures in the wheel brake cylinder can be built up unhindered.

Yet a third magnet valve is actuated by the electromagnet; the third magnet valve is disposed as an outlet valve between the valve outlet and a relief line, and by means of the third magnet valve the pressure at the valve outlet and hence in the wheel brake cylinder can be reduced. The valve member of this outlet magnet valve is urged in the closing direction by a valve closing spring that closes the outlet valve when there is no current to the electromagnet. The valve member! is coupled to the electromagnet in such a way that when the electromagnet is triggered by a first current intensity, at which the two inlet valves are released by the restoring springs fox the closing motion, remains in its closing position, and does not lift from the associated valve seat counter to the force of the closing spring, or in other words open the outlet valve, until the electromagnet is triggered by a second, greater current intensity.

The two inlet valves and the outlet valve of the known magnet valve assembly together with the common electromagnet for driving the valve members form a 3/3-way magnet valve with which the brake pressure in the wheel brake cylinder can be built up and reduced again in throttled or unthrottled fashion. Structurally, this magnet valve assembly is very complicated, making its manufacture relatively expensive.

OBJECT AND SUMMARY OF THE INVENTION

It is a principal object of the magnet valve according to the invention to provide the advantage over the prior art of a structurally simple design in the form of a two-way valve with three switching positions, in which the valve opening is selectively uncovered and closed in either throttled or unthrottled fashion. To produce the magnet valve of the invention, use can preferably be made of standard valves that are used in the form of 2/2-way magnet inlet valves in brake systems; then the entire housing and the electromagnets can be used, and the only modifications needed are to replace the valve member and to expand the triggering of the electromagnet by one stage. To trigger the electromagnet, conventional current regulators may be used, of the kind used to trigger 3/3-way magnet valves. The space required for the magnet valve of the invention is accordingly no greater than that of the former 2/2-way magnet inlet valve in brake systems, and is markedly less than for the magnet valve assembly described at the outset, in its 3/3-way magnet valve version, with three separate valves integrated into a common valve housing and actuated by a common electromagnet.

One advantageous physical embodiment of the magnet valve of the invention is achieved, in a preferred embodiment of the invention, by embodying the valve member in two parts, which cooperates with a valve seat to open and uncover a valve opening located between a valve inlet and a valve outlet and surrounded by the valve seat. The valve member comprises a valve tappet, connected to an armature of the electromagnet, on whose face end remote from the armature a closing element is embodied, and a closing cap that is thrust over this face end of the valve tappet and is displaceable axially thereon; the closing cap is supported on the valve tappet via a barrier spring. A second closing element cooperating with the valve seat is provided on the outside of the bottom of the closing cap, and a second valve seat cooperating with the first closing element on the valve tappet is provided on the inside of the closing cap. The cap bottom has a central axial throttle bore, and the cap wall has at least one radial bore. With this structural embodiment of the magnet valve of the invention, the valve member can be mounted externally.

Once the magnet valve is assembled, the restoring spring is supported on the closing cap. The spring force of the restoring spring is dimensioned to be less than that of the barrier spring and is designed such that with no power to the electromagnet, it lifts the closing element of the closing cap from the associated valve seat; that is, the magnet valve is then opened. The maximum exciter current for triggering the electromagnet is dimensioned such that the magnetic force thus generated by the electromagnet is greater than the sum of the spring forces of the restoring and barrier springs plus the compressive force exerted on the closing cap by the pressure at the valve inlet. Conversely, in the first switching stage, the exciter current of the electromagnet, which is less than the maximum exciter current, is dimensioned such that the magnetic force thus generated by the electromagnet is greater than the sum of the spring force of the restoring spring and the compressive force exerted on the closing cap by the pressure at the valve inlet, but less than the spring force of the barrier spring.

The invention will be better understood and further objects and advantages thereof will become more apparent from the ensuing detailed description of a preferred embodiment taken in conjunction with the drawings.

DESCRIPTION OF THE PREFERRED EMBODIMENT

Figure 1:
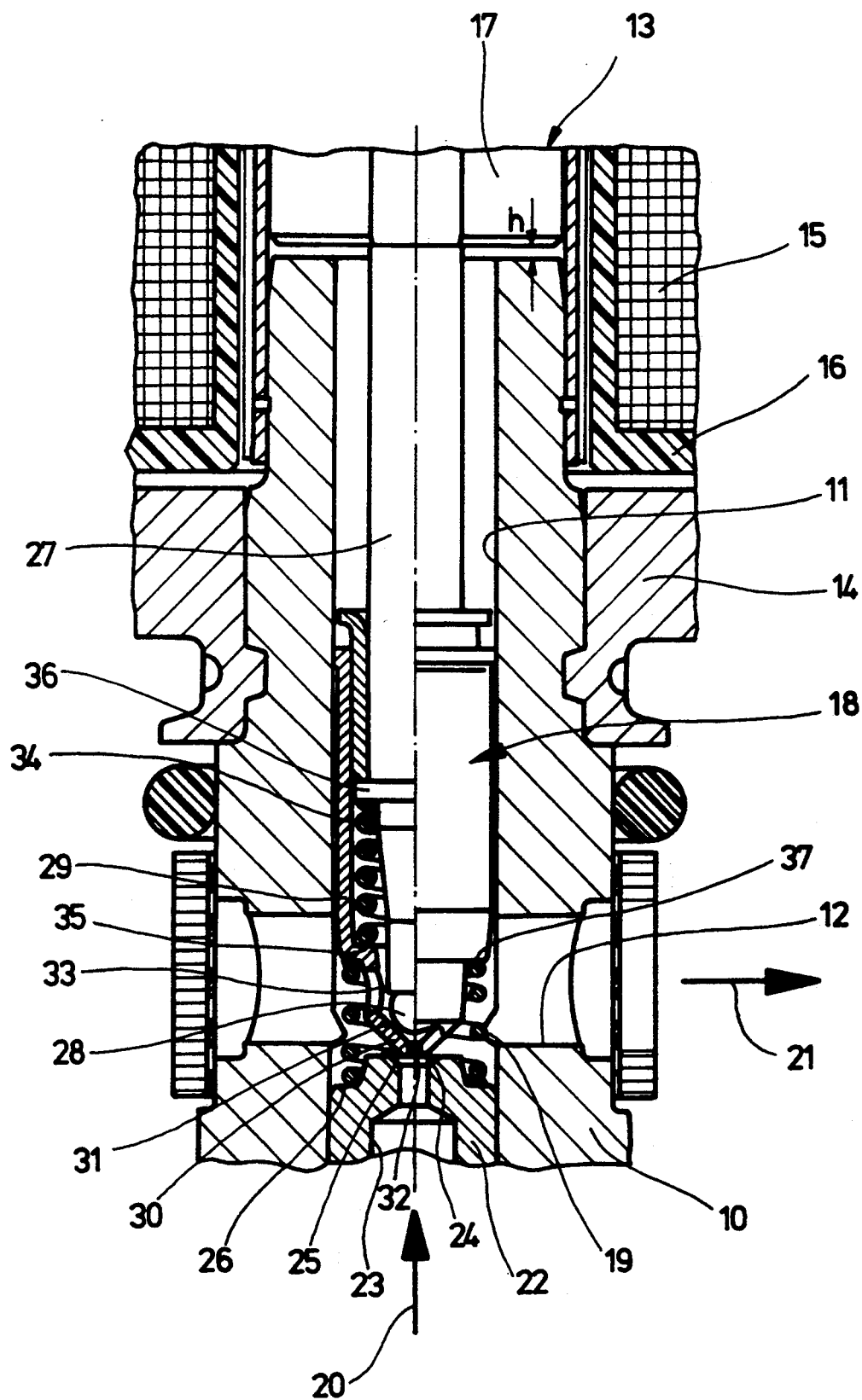
FIG. 1 is a detail of a longitudinal section through a magnet valve for an anti-lock vehicle brake system.
Figure 2A:
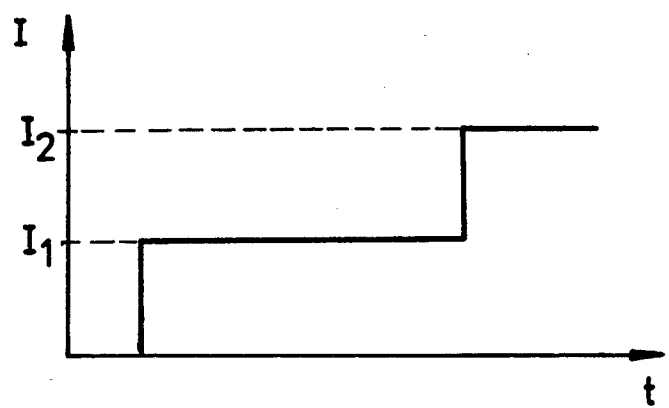
FIGS. 2a and 2b show two diagrams to illustrate the connection between the exciter current of the electromagnet and the pressure control at the valve outlet of the magnet valve of FIG. 1.

The magnet valve, a detail of which is shown in longitudinal section in FIG. 1, is used as an inlet valve in an anti-lock motor vehicle brake system. The magnet valve has a housing 10 with a central longitudinal bore and with a transverse bore 12 that pierces the longitudinal bore, and an electromagnet 13 is mounted on one face end. In a known manner, the electromagnet 13, only part of which is shown, comprises a magnet cup 14 that is slipped over the face end of the housing 10 and beyond the housing, an exciter coil 15 axially disposed in the magnet cup and received on a cylindrical coil holder 16, and an armature 17 guided axially displaceably in the interior of the coil holder 16; when the electromagnet 13 is not excited, the armature 17 rests at a stroke length h from the face end of the housing 10. As can be seen from the upper diagram in FIG. 2a, the exciter coil 15 of the electromagnet 13 is triggered with two exciter currents 11 and 12, which have different current intensities. The electromagnet 13 serves to actuate a valve member 18, which is pressed by a restoring spring 19 against the armature 17 of the electromagnet 13 and moves the valve member into two displaced positions depending on its triggering with the two different exciter currents $I_1$, $I_2$.

The valve member 18 serves to control the connection between a valve inlet and a valve outlet, which are suggested by arrows 20 and 21 in FIG. 1. The valve inlet 20, provided for connection to a pressure source, discharges at the end of the housing 10 remote from the electromagnet 13 in the longitudinal bore 11, while the valve outlet 21 intended for connection to a pressure receiver communicates with the transverse bore 12. A valve body 22, which is pierced by an axial stepped bore 23, is pressed into the segment of the longitudinal bore 11 located between the valve inlet 20 and the transverse bore 12. One end of the valve body 22 rests immediately upstream of the transverse bore 12, and the bore mouth, located at that face end, of the smaller-diameter segment of the stepped bore 23 forms the valve opening 24 of the magnet valve that is controlled by the valve member 18. The valve opening 24 is concentrically surrounded by a valve seat 25 embodied on the valve body 22. An annular shoulder 26 is also formed on the valve body 22, and on the annular shoulder the restoring spring 19, embodied as a helical compression spring, is supported.

The valve member 18, which is shown partly in longitudinal section in FIG. 1, is embodied in two parts and comprises a valve tappet 27, on whose end toward the valve body 22 a first closing element 28 is embodied, and a closing cap 29 slipped over the end of the valve tappet 27 that has the closing element 28; on the outside of its bottom toward the valve body 22, this closing cap is provided with a second closing element 30 that cooperates with the valve seat 25 on the valve body 22, and on its inside the second closing element is provided with a second valve seat 31, which cooperates with the first closing element 28 on the valve tappet 27. The closing element 30 is frustoconical in embodiment; a closing face adapted to the valve seat 25 is formed on its outer jacket face, and a valve seat face adapted to the spherical closing element 28 is formed on its inside jacket face. A central throttle bore 32 is made axially in the cap bottom, while at least one radial bore 33 is provided in the cap wall. Via the interior of the closing cap 29, the throttle bore 32 and the radial bore 33 communicate with one another; this communication is interrupted whenever the spherical closing element 28 formed on the valve tappet 27 rests on the valve seat 31 embodied on the bottom of the closing cap 29.

The closing cap 29 that is axially displaceable on the valve tappet 27 is deep-drawn from sheet metal and is supported on the valve tappet 27 via a barrier spring 34. The barrier spring 34 is embodied as a helical compression spring, which coaxially surrounds the valve tappet 27 in the interior of the closing cap 29 and is supported both on an inner annular shoulder 35 of the closing cap 29 and on a radial flange 36 of the valve tappet 27. The annular shoulder 35 is raised toward the inside from the closing cap 29, and the closing cap 29 fits all the way over the barrier spring 34 to beyond the radial flange 36. The valve tappet 27 extends as far as the housing 10, where it rests on the armature 17 of the electromagnet 13, with the contact pressure being brought to bear by the restoring spring 19, which is supported on the closing cap 29 on an outer annular shoulder 37 and presses the valve tappet 27 against the armature 17 via the barrier spring 34. The biasing or the spring force of the barrier spring 34 is dimensioned to be substantially greater than the biasing or spring force of the restoring spring 19, by way of example being 5 times as strong.

The mode of operation of the magnet valve described is as follows:

When the electromagnet 13 is not excited, the valve member 19 assumes its position shown in FIG. 1. The closing element 30 embodied on the closing cap 29 is lifted away from the valve seat 25 on the valve body 22. The valve opening 24 is uncovered, and brake fluid can flow from the valve inlet 20 to the valve outlet 21. When the magnet valve is used in a brake system, the master cylinder communicates with the valve inlet 20 and a wheel brake cylinder of the brake system communicates with the valve outlet 21, so that a brake pressure can be built up in the wheel brake cylinder via the master cylinder.

If the exciter coil 15 is supplied with the exciter current $I_1$ (FIG. 1), then the armature 17 of the electromagnet 13 moves by a stroke length shorter than the maximum stroke h in the direction of the face end of the housing 10. By means of the valve tappet 27 carried along in the process by the armature 17, and via the barrier spring 34, the closing cap 29 is moved toward the valve body 22 and takes a seat, with its closing element 30, on the valve seat 25 embodied on the valve body 22. The exciter current $I_1$ is dimensioned such that the magnetic force thus generated by the electromagnet 13 is greater than the sum of the spring force of the restoring spring 19 and the compressive force exerted on the closing cap 29 by the pressure at the valve inlet 20, but less than the spring force of the barrier spring 34. Hence the closing element 28 formed on the valve tappet 27 remains lifted from the valve seat 31 formed on the inside of the bottom of the closing cap 29, and communication exists between the valve inlet 20 and the valve outlet 21, via the throttle bore 32 and the radial bore 33 in the closing cap 29. Hence the flow of brake fluid from the valve inlet 20 to the valve outlet 21 is throttled, and brake pressure can build up only in delayed fashion at the valve inlet 21 or in the wheel brake cylinder connected to it. This triggering of the electromagnet 13 with the lesser exciter current $I_1$ is carried out in the anti-lock mode, in order to slow down the speed of pressure rise in the wheel brake cylinder and, despite the high pressure drop between the valve inlet 20 and the valve outlet 21, to keep the quantity of brake fluid drawn per unit of time and flowing to the wheel brake cylinder within limits.

If the exciter coil 15 of the electromagnet 13 is acted upon by the maximum exciter current $I_1$, then the spring force or biasing of the barrier spring 34 is overcome by the increased magnetic force, and the valve tappet 27 is displaced by the armature 17 far enough that its spherical closing element 28 meets the valve seat 31 formed on the interior of the bottom of the closing cap 29. Hence the throttling communication between the valve inlet 20 and the valve outlet 21 is also interrupted, and the valve opening 24 is sealed off completely. In this position of the magnet valve, the wheel brake cylinder is disconnected from the master cylinder, and the pressure in the wheel brake cylinder can be maintained as is or decreased further by means of an outlet valve. In order to assure this function of the magnet valve, the maximum exciter current $I_2$ for triggering the electromagnet 13 should be dimensioned such that the magnetic force thereby generated by the electromagnet 13 is greater than the sum of the spring force of the restoring and barrier springs 19, 34 and the compressive force embodied by the pressure at the valve outlet 21 on the closing cap 29.

If the triggering of the electromagnet 13 disappears, then the valve member is displaced back into its valve opening position shown in FIG. 1 by the restoring spring 19, and a direct, unthrottled communication exists between the valve inlet 20 and the valve outlet 21. In this position of the magnet valve, large quantities of pressure fluid can flow from the master cylinder into the wheel brake cylinder, and the brake pressure desired by the driver becomes operative without delay in the wheel brake cylinder. This position of the magnet valve is brought about during braking and with the anti-lock system not in operation. In the lower diagram of FIG. 2b, the pressure $P_{Red}$ in the wheel brake cylinder or at the valve outlet 21 is plotted over time. In the range or segment marked 1, the electromagnet 13 is not excited. The valve opening 24 of the magnet valve is uncovered with its maximum flow cross section. Upon actuation of the brake pedal, large quantities of brake fluid therefore flow from the master cylinder into the wheel brake cylinder. The brake pressure gradient, in other words the speed with which the brake pressure rises, is very high, and the brake pressure set by the driver becomes operative in the wheel brake cylinder without major delay.

Figure 2B:
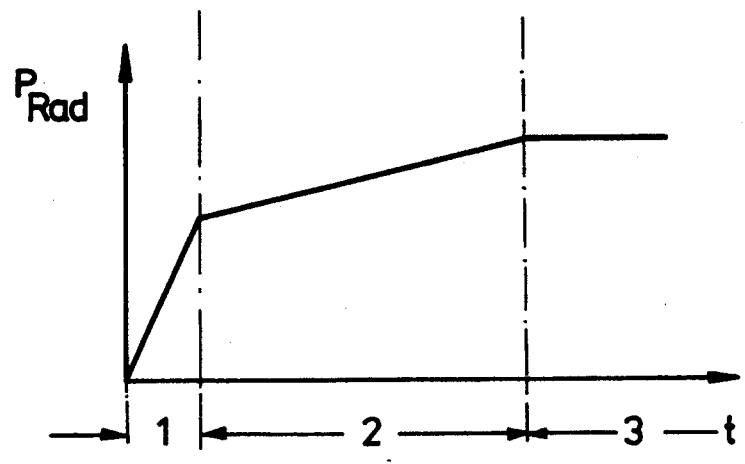

In segment 2 in FIG. 2b, the electromagnet 13 is triggered with the exciter current $I_1$. This is the situation if the wheel sensors sense wheel slip and the anti-lock system is activated. The valve opening is partially sealed off by the closing element 30 on the closing cap 29 that takes its seat on the valve seat 25 on the valve body 22, and the only cross section now available to the flow of pressure fluid is that of the throttle bore 32. The brake pressure gradient in the wheel brake cylinder or at the valve outlet 21 decreases sharply. A pressure buildup in the wheel brake cylinder initiated again after a pressure decrease in the wheel brake cylinder takes place substantially more slowly.

In the segment 3 in FIG. 2b, the electromagnet 13 is triggered with the maximum exciter current $I_2$. Here the spherical closing element 28 on the valve tappet 27 takes its seat on the valve seat 31 on the closing cap 29 and also closes the throttle bore 32. This hermetically separates the valve outlet 21 from the valve inlet 20. The pressure at the valve outlet or in the wheel brake cylinder is maintained, or may be lowered via an outlet valve additionally provided at the wheel brake cylinder.

Figure 3:
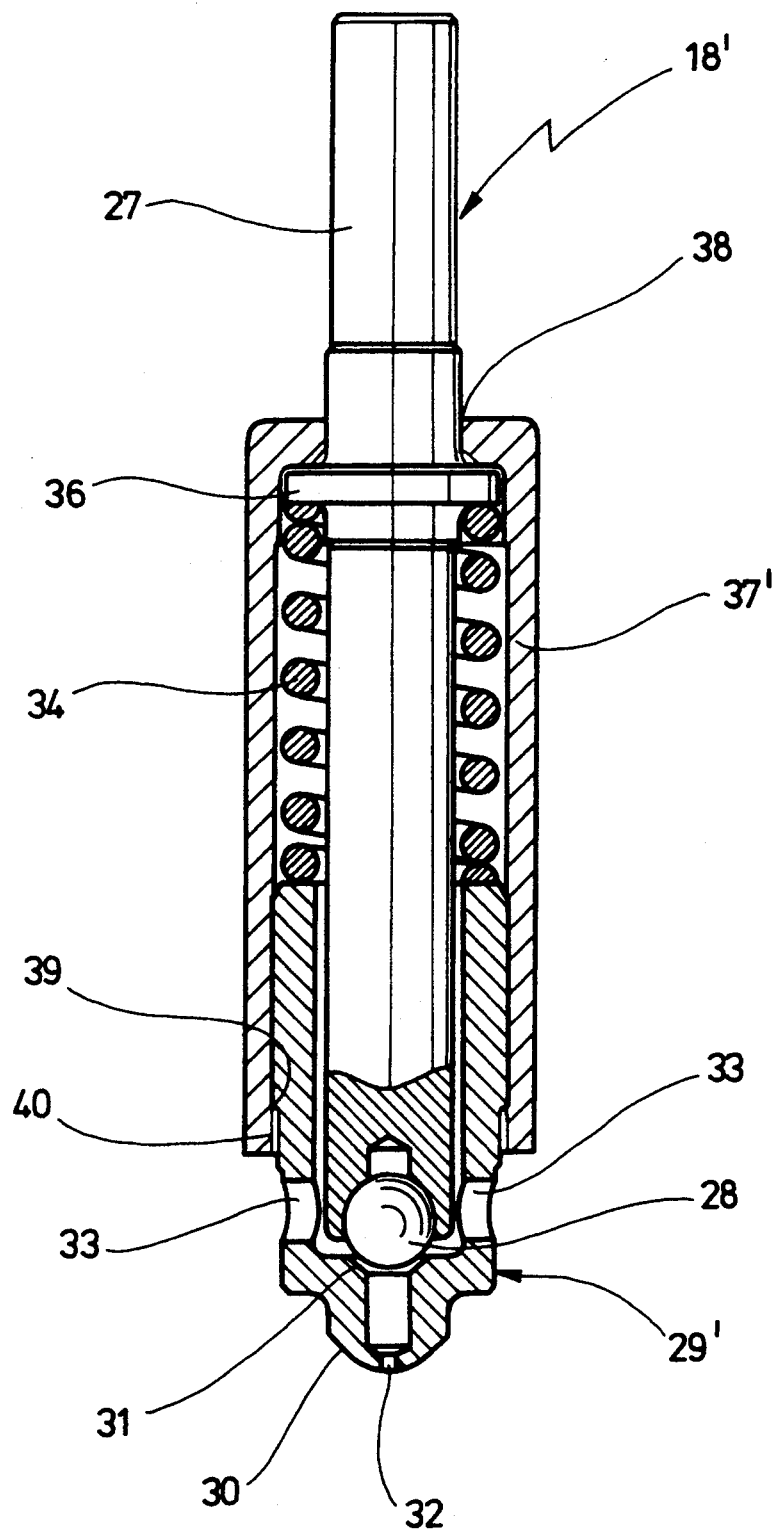
FIG. 3 is a longitudinal section through a modified valve member in the magnet valve of FIG. 1.

FIG. 3 shows a longitudinal section of a modified valve member 18', of the kind that may be used in the magnet valve of FIG. 1 instead of the valve member 18 described above. In this valve member 18', the closing cap 29' is produced as a lathe-turned part and thus is easier to manufacture than the deep-drawn part of the closing cap 29 for the valve member 18. The closing cap 29' is here formed by a cup-shaped lathe-turned part, and the closing element 30, the coaxial valve seat 31 and the coaxial throttle 32 are again embodied on the bottom of the turned part. The radial bores 33 are made in the cylindrical wall of the turned part. The valve tappet 27, in an unaltered way, carries the first closing element 28 embodied as a ball on its face end, as well as the radial flange 36 axially spaced apart from the face end. The barrier spring 34, again embodied as a helical compression spring, is supported on one end in the same way on the annular face of the annular flange 36, and on the other on the annular face end of the closing cap 29'. The barrier spring 34 and the great majority of the cylindrical wall of the closing cap 29', with the exception of the region of the radial bores 33, is engaged on its outside by a cuplike guide sheath 37', the bottom of which is provided with a central hole 38 so that the guide sheath 37' can be slipped over the valve tappet 27. The sheath bottom then surrounds the valve tappet 27 at a slight distance and rests with its inside bottom face against the radial flange 36 of the valve tappet 27. Near its edge remote from the sheath bottom, the guide sheath 37' has at least one radially inwardly protruding stop 39, which under the influence of the barrier spring 34 is pressed against a counterpart stop 40 on the closing cap 29'. By way of example, the stop 39 and the counterpart stop 40 may be embodied by a bayonet mount, which for instance comprises at least one radial tang protruding from the inner wall of the guide sheath 37' and at least one axial groove beginning at the free end of the closing cap 29' and merging at its end with a transverse groove extending circumferentially of the closing cap 29'. The guide sheath 37', on being slipped onto the closing cap 29', should be positioned such that the radial tang can slide along the inside of the axial groove. By a turning motion following the motion by which the sheath is slipped onto the cap, the radial tang is then inserted into the transverse groove, so that the stop 39 and the counterpart stop 40 now rest on one another. The outside diameter of the guide sheath 37' is dimensioned such that the valve member 18' is guided virtually without play in the longitudinal bore 11 in the housing 10.

This structural embodiment of the valve member 18' has the advantage that the valve member 18' can be mounted externally; the biasing of the barrier spring 34 can also already be set in the process, and the stroke of the closing element 28 can be adjusted.

The foregoing relates to a preferred exemplary embodiment of the invention, it being understood that other variants and embodiments thereof are possible within the spirit and scope of the invention, the latter being defined by the appended claims.

What is claimed and desired to be secured by Letters Patent of the United States is:

1. A magnet valve for anti-lock vehicle brake systems, having a housing (10) having a longitudinal bore (11) with a transverse bore (12), an electromagnet (13) related to said housing (10), a valve body (22) in said longitudinal bore, said valve body includes a first valve seat (25), a valve member (18) that cooperates with said first valve seat, a valve inlet (20) for connection of a pressure source in a master cylinder, and a valve outlet (21) for connection of a pressure receiver in a wheel brake cylinder; said valve member (18) cooperates with said first valve seat (25) to control a connection between the valve inlet (20) and the valve outlet (21); said valve members (18) is embodied in two parts and includes a tappet (27) coupled to an armature of the electromagnet, said electromagnet (13) is triggerable by minimum and maximum different exciter currents ($I_1$, $I_2$) for actuating the valve member (18); a restoring spring (19) for returning the valve member (18) when the electromagnet (13) is without power; a first closing element (28) is formed on a face end of said valve tappet (27) remote from the armature (17), and a closing cap (29, 29') is slipped over the face end of the valve tappet (27) and is axially displaceable thereon, said closing cap includes a wall and is supported on the valve tappet (27) via a barrier spring (34) and having a cap bottom on an outside of which a second closing element (30) cooperates with said first valve seat (25) and on an inside of which a second valve seat (31) cooperates with the first closing element (28) embodied on the face end of the valve tappet; a central, axial throttle (32) is defined in the cap bottom and operative between the valve inlet (20) and the valve outlet (21) for delaying a pressure rise at the valve outlet (21), said throttle bore (32) being disposed in the valve member (18) and the valve member being embodied such that by triggering the electromagnet (13) with the minimum exciter current ($I_1$), the throttle bore (32) between the valve inlet (20) and the valve outlet (21) is switched on and the valve inlet (20) and the valve outlet (21) communicate with each other via the throttle bore (32), and upon a triggering of the electromagnet (13) by the maximum exciter current ($I_2$) the valve inlet (20) and the valve outlet (21) are each disconnected from one another, in an absence of electromagnet triggering, the valve inlet (20) and the valve outlet (32) are made to communicate with one another, said central, axial throttle bore (32) is defined in the cap bottom, and at lest one radial bore (33) is made in the cap wall, said central, axial throttle bore and said radial bore being interconnected, the embodiment of the valve member (18) is chosen such that in the absence of electromagnet triggering, the valve inlet and outlet (20, 21) communicate with one another; upon triggering of the electromagnet (13) by the maximum exciter current ($I_2$), the valve inlet and outlet (20, 21) are sealed off from one another; and upon triggering of the electromagnet (13) by the minimum exciter current ($I_1$) that is reduced compared with the maximum exciter current ($I_2$), the valve inlet and outlet (20, 21) communicate with one another via the throttle (32).

2. A valve as defined by claim 1, in which the restoring spring (19) engages the closing cap (29) and is disposed such that when there is no power to the electromagnet (13), the restoring spring lifts the second closing element (30) of the closing cap from the first valve seat (25) surrounding the valve opening (24), and the spring force of the barrier spring (34) is dimensioned to be substantially greater than that of the restoring spring (19).

3. A valve as defined by claim 2, in which the second closing element (30) is embodied frustoconically, a closing face that cooperates with the first valve seat (25) that surrounds the valve opening (24) is embodied on an outer jacket face thereof, and the second valve seat (31) that cooperates with the first closing element (28) is embodied on an inner jacket face thereof.

4. A valve as defined by claim 3, in which a longitudinal bore (11) and a transverse bore (12) that penetrates said longitudinal bore are defined in a valve housing (10); the longitudinal bore (11) communicates on one end with the valve inlet (20) and the transverse bore (12) communicates with the valve outlet (21); in a bore segment between the valve inlet (20) and the transverse bore (12), a valve body (22) having a central through bore (23) is inserted, on a face end of said valve body toward the transverse bore (12) the first valve seat (25) is embodied coaxially with a mouth, forming the valve opening (24), of the through bore (23); the closing cap (29), seated displaceably on the vale tappet (27), rests axially displaceably in the segment of the longitudinal bore (11) located on a far side of the transverse bore; and the restoring spring (19) embodied as a helical compression spring is supported on one annular shoulder each (37, 36), embodied on the closing cap (29) and on the valve body (22), respectively.

5. A valve as defined by claim 2, in which a longitudinal bore (11) and a transverse bore (12) that penetrates said longitudinal bore are defined in a valve housing (10); the longitudinal bore (11) communicates on one end with the valve inlet (20) and the transverse bore (12) communicates with the valve outlet (21); in a bore segment between the valve inlet (20) and the transverse bore (12), a valve body (22) having a central through bore (23) is inserted, on a face end of said valve body toward the transverse bore (12) the first valve seat (25) is embodied coaxially with a mouth, forming the valve opening (24), of the through bore (23); the closing cap (29), seated displaceably on the valve tappet (27), rests axially displaceably in the segment of the longitudinal bore (11) located on a far side of the transverse bore; and the restoring spring (19) embodied as a helical compression spring is supported on one annular shoulder each (37, 26), embodied on the closing cap (29) and on the valve body (22), respectively.

6. A valve as defined by claim 5, in which the electromagnet (13) is mounted on, and partly fits over, a face end of the valve housing (10) remote from the valve inlet (20), and the vale tappet (27), when the electromagnet (13) is not excited, protrudes by a predetermined extent (h) beyond the face end of the valve housing (10) and on its face end rests on the armature (17) of the electromagnet (13).

7. A valve as defined by claim 2, in which the maximum exciter current ($I_2$) for triggering the electromagnet (13) is dimensioned such that a magnetic force thus generated by the electromagnet (13) is greater than a sum of any spring forces of the restoring spring (19) and a barrier spring (34) and a compressive force is exerted on a closing cap (29) by the pressure at the valve inlet (20).

8. A valve as defined by claim 1, in which the second closing element (30) is embodied frustoconically, a closing face that cooperates with the first valve seat (25) that surrounds the valve opening (24) is embodied on an outer jacket face thereof, and the second valve seat (31) that cooperates with the first closing element (28) is embodied on an inner jacket face thereof.

9. A valve as defined by claim 8, in which a longitudinal bore (11) and a transverse bore (12) that penetrates said longitudinal bore are defined in a valve housing (10); the longitudinal bore (11) communicates on one end with the valve inlet (20) and the transverse bore (12) communicates with the valve outlet (21); in a bore segment between the valve inlet (20) and the transverse bore (12), a valve body (22) having a central through bore (23) is inserted, on a face end of said valve body toward the transverse bore (12)the first valve seat (25) is embodied coaxially with a mouth, forming the valve opening (24), of the through bore (23); the closing cap (29), seated displaceably on the valve tappet (27), rests axially displaceably in the segment of the longitudinal bore (11) located on a far side of the transverse bore; and the restoring spring (19) embodied as a helical compression spring is supported on one annular shoulder each (37, 26), embodied on the closing cap (29) and on the valve body (22), respectively.

10. A valve as defined by claim 8, in which the maximum exciter current ($I_2$) for triggering the electromagnet (13) is dimensioned such that a magnetic force thus generated by the electromagnet (13) is greater that a sum of any spring forces of the restoring spring (19) and a barrier spring (34) and a compressive force is exerted on a closing cap (29) by the pressure at the valve inlet (20).

11. A valve as defined by claim 1, in which a longitudinal bore (11) and a transverse bore (12) that penetrates said longitudinal bore are defined in a valve housing (10); the longitudinal bore (11) communicates on one end with the valve inlet (20) and the transverse bore (12) communicates with the valve outlet (21); in a bore segment between the valve inlet 92) and the transverse bore (12), a valve body (22) having a central through bore (23) is inserted, on a face end of said valve body toward the transverse bore (12) the first valve seat (25) is embodied coaxially with a mouth, forming the valve opening (24), of the through bore (23); the closing cap (29), seated displaceably on the valve tappet (27), rests axially displaceably in the segment of the longitudinal bore (11) located on a far side of the transverse bore; and the restoring spring (19) embodied as a helical compression spring is supported on one annular shoulder each (37, 26), embodied on the closing cap (29) and on the valve body (22), respectively.

12. A valve as defined by claim 11, in which the electromagnet (13) is mounted on, and partly fits over, a face end of the vale housing (10) remote from the valve inlet (20), and the vale tappet (27), when the electromagnet (13) is not excited, protrudes by a predetermined extent (h) beyond the face end of the valve housing (10) and on its face end rests on the armature (17) of the electromagnet (13).

13. A valve as defined by claim 12, in which the cylindrical part of the guide sheath (37') has at least one radially inwardly protruding stop (39), against which the closing cap (29') is pressed by the barrier spring (34), by a counterpart stop (40) formed on the closing cap.

14. A valve as defined by claim 1, in which the maximum exciter current ($I_2$) for triggering the electromagnet (13) is dimensioned such that a magnetic force thus generated by the electromagnet (13) is greater than a sum of any spring forces of the restoring spring (19) and a barrier spring (34) and a compressive force is exerted on a closing cap (29) by the pressure at the valve inlet (20).

15. A valve as defined by claim 1, in which the minimum exciter current ($I_1$) that is lower by comparison with the maximum exciter current ($I_2$) for triggering the electromagnet (13) is dimensioned such that a magnetic force thus generated by the electromagnet (13) is greater than a sum of the spring force of the restoring spring (19) and the compressive force exerted on the closing cap (29) by the pressure at the valve inlet (20), but less than the spring force of the barrier spring (34).

16. A valve as defined by claim 1, in which the closing cap (29) is deep-drawn from sheet metal, and the barrier spring (34) fits all the way over the valve tappet (27) beyond a support point (36), and the barrier spring (34) is supported on the face end of the valve tappet on an annular shoulder (31) raised so as to protrude inward in the closing cap (29).

17. A valve as defined in claim 1, in which the closing cap (29') is made as a cup-shaped lathe-turned part, with a second closing element (30) formed on a bottom of the lathe-turned part and with the valve seat (31) and the throttle (32); the barrier spring (34) is supported at one end on an annular face end of the turned part and at an opposite end on a radial flange (36) formed on the valve tappet (27); and a cup-shaped guide sheath (37') is slipped by a central hole (38) in a bottom of the sheath onto the valve tappet (27) in such a way that the bottom of the sheath rests on the radial flange (36), and a shank of the sheath fits over the barrier spring (34) and part of a cylinder wall of the lathe-turned part.

* * * * *